O. A. & J. B. FLADBY.
BUGGY EVENER CLEVIS.
APPLICATION FILED AUG. 25, 1909.
1,016,134.
Patented Jan. 30, 1912.
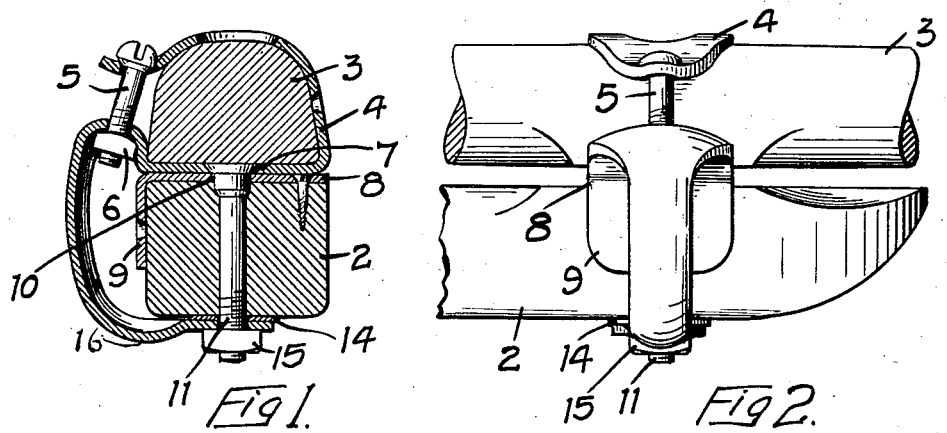
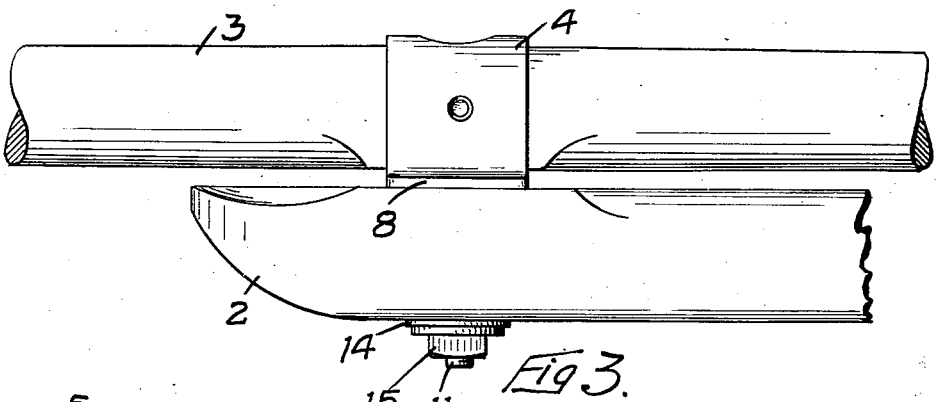
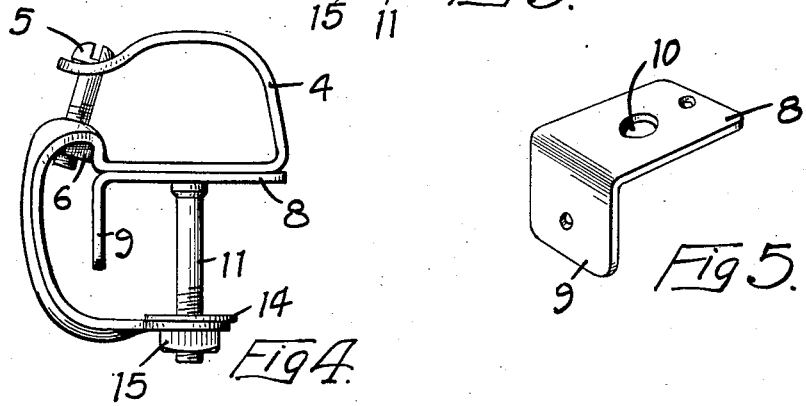
WITNESSES
INVENTORS
OLE A. FLADBY
JOHN B. FLADBY
BY Paul & Paul
ATTORNEYS

UNITED STATES PATENT OFFICE.

OLE A. FLADBY AND JOHN B. FLADBY, OF RUTLAND, NORTH DAKOTA.

BUGGY-EVENER CLEVIS.

1,016,134. Specification of Letters Patent. Patented Jan. 30, 1912.

Application filed August 25, 1909. Serial No. 514,522.

*To all whom it may concern:*

Be it known that we, OLE A. FLADBY and JOHN B. FLADBY, of Rutland, Sargent county, North Dakota, have invented certain new and useful Improvements in Buggy-Evener Clevises, of which the following is a specification.

Our invention relates to safety clevises for eveners and swingle trees.

The object of the invention is to provide a clevis capable of pivotally connecting a swingle tree with an evener without the use of screws or bolts extending into or through said swingle tree, thereby avoiding the weakening of the wood of the swingle tree at the point of greatest strain.

The invention consists generally in the constructions and combinations hereinafter described and particularly pointed out in the claims.

In the accompanying drawings, forming part of this specification, Figure 1 is a transverse vertical section of an evener and swingle tree with our improved clevis arranged thereon, Fig. 2 is a rear elevation of a portion of the swingle tree and evener, showing the clevis in position, Fig. 3 is a front view of a portion of a swingle tree and evener showing the clevis arranged thereon, Fig. 4 is an elevation of the clevis, Fig. 5 is a detail, perspective view of the plate, as arranged to rest upon the surface of the evener.

In the drawing, 2 represents an evener and 3 a swingle tree, both of which may be of ordinary construction. The swingle tree is preferably made light and small and this we can readily do without weakening the same, owing to the fact that there is no bolt hole through the swingle tree for the pivot bolt.

The main portion of the clevis consists of the strap 4, which passes around the swingle tree 3 and is provided with the downwardly extending portion 16 that passes under the evener, as shown in Fig. 1. This strap is preferably stamped from a single piece of sheet metal and is provided with openings adapted to receive a screw bolt 5 carrying a nut 6, by means of which the strap may be clamped solidly to the swingle tree 3. A central hole 7 is provided in the strap 4 directly under the center of the swingle tree. A plate 8 rests upon the top of the evener and is provided with the downwardly turned end 9. This plate is shown in the perspective view in Fig. 5. It is provided with an opening 10 and a pivot bolt 11 is passed through the central opening in the strap 4 and the shoulder on the under side of the head of said bolt rests upon the plate 8, being countersunk in the horizontal or flat portion of the strap 4. At its under side the swingle tree is provided with a washer plate 14, and the bolt 11 after passing through the evener and through the plate 14, is provided with a nut 15, by means of which the clevis surrounding the swingle tree 3, as well as the swingle tree and its pivot bolt 11 are compelled to remain properly connected and in proper alinement.

When it is desired to remove the swingle tree from the strap 4, the bolt 5 is partially or wholly released and the swingle tree can then be readily removed from said strap.

The advantages of the construction arise principally from the fact that there are no holes through the swingle tree, which may therefore, be made small and light. The strap, which passes around the swingle tree, is preferably made by stamping from a single piece of sheet metal and it is connected to the pivot bolt, both by means of the head of said bolt and also by having the threaded end pass through the opening in the lower part of said strap, the bolt being secured in place by means of the nut 15.

The construction is very simple and durable and the strap may be tightened up around the swingle tree at any time by means of the bolt 5.

We do not limit ourselves to the details of construction, but same may be varied in many particulars, without departing from our invention.

While we have shown the clevis as applied for securing a swingle tree to an evener, it will be understood that the clevis is applicable for securing a swingle tree to the cross bar of a pair of buggy thills, or for securing an evener to its support.

We claim as our invention:—

1. The combination, with an evener and swingle tree, of a clevis comprising a strap 4 extending around said swingle tree and having a downwardly extending end that projects beneath the evener and is provided with an opening in vertical alinement with the pivotal point of said swingle tree, the bolt 5 connecting the parts of the strap 4, a plate 8 arranged upon the top of said evener, and the bolt 11 extending through the strap 4 at the under side of the swingle tree, through the plate 8 and the evener and through the free end of the strap 4, substantially as described.

2. The combination, with an evener and swingle tree, of a clevis comprising a strap extending partially around the swingle tree, said clevis having a loop formed therein, the upper portion of said loop being near the free end of said strap, a bolt passing through said free end and through said loop and adapted to draw said strap snugly around the swingle tree, the lower portion of said loop having an end extending backwardly under the evener, and a pivot bolt passing through the lower portion of said strap and through said evener and the end of said loop and pivotally connecting said swingle tree and evener together.

In witness whereof, we have hereunto set our hands this 20th day of August 1909.

OLE A. FLADBY.
JOHN B. FLADBY.

Witnesses:
J. H. JOHNSON,
V. H. ALSTEAD.

Copies of this patent may be obtained for five cents each, by addressing the "Commissioner of Patents, Washington, D. C."